Jan. 26, 1943.  M. WARE  2,309,227
INTERNAL COMBUSTION ENGINE
Filed Sept. 7, 1940  3 Sheets-Sheet 1
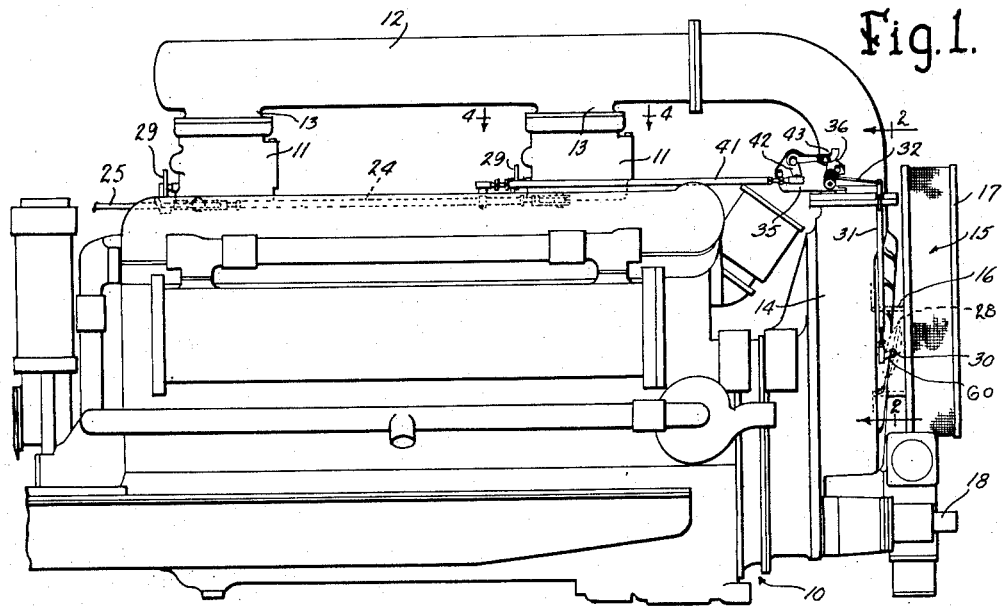
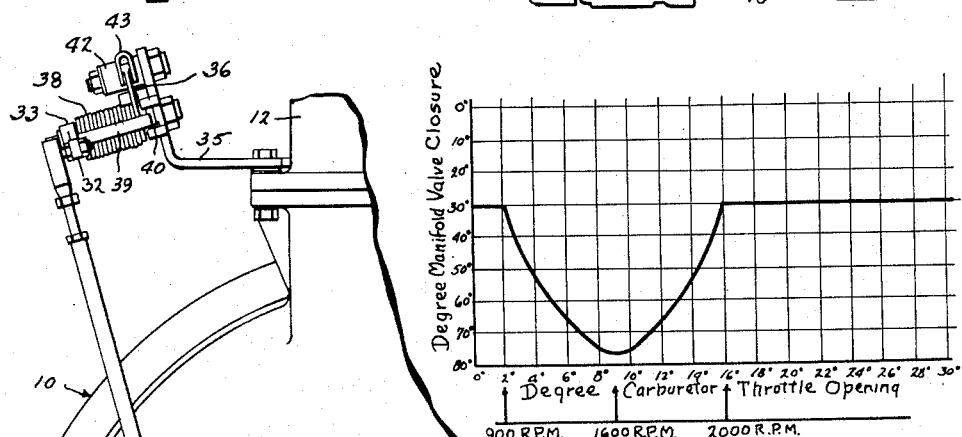
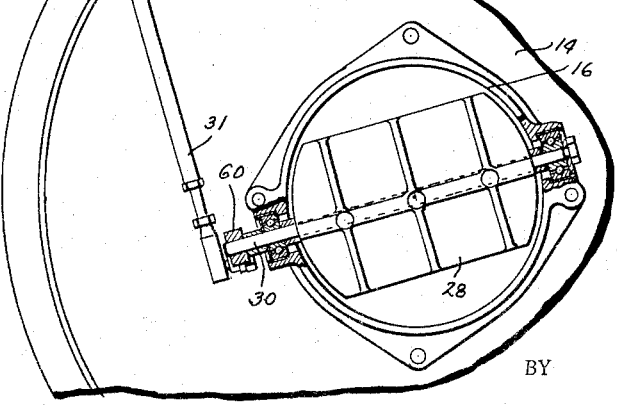
INVENTOR.
Marsden Ware Jan. 26, 1943. M. WARE 2,309,227
INTERNAL COMBUSTION ENGINE
Filed Sept. 7, 1940 3 Sheets-Sheet 2
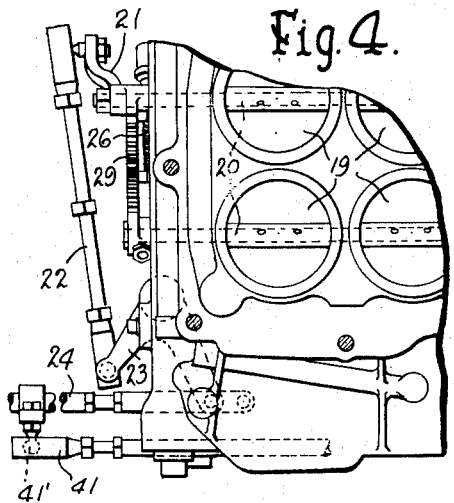
Fig.4.
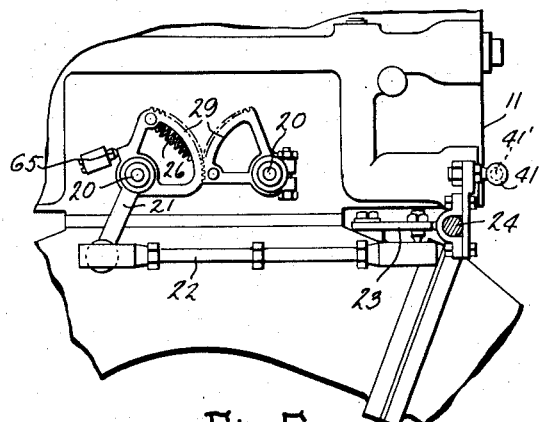
Fig.5.
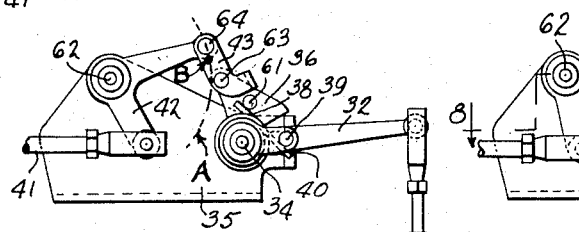
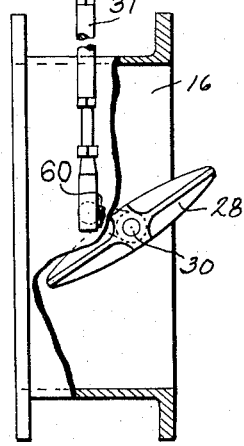
Fig.6.
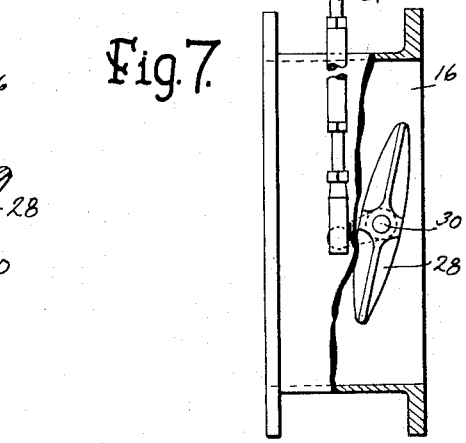
Fig.7.
INVENTOR.
Marsden Ware
BY
Tibbetts & Hart
Attys.

INVENTOR.
Marsden Ware
BY
Attys.

Patented Jan. 26, 1943

2,309,227

UNITED STATES PATENT OFFICE 2,309,227

INTERNAL COMBUSTION ENGINE

Marsden Ware, Huntington Woods, Mich., assignor to Packard Motor Car Company, Detroit, Mich., a corporation of Michigan Application September 7, 1940, Serial No. 355,748

6 Claims. (Cl. 123—119)

This invention relates to internal combustion engines and more particularly to engines employing supercharged fuel systems.

Superchargers for multi-cylinder internal combustion engines are sometimes located on the inlet side of a plurality of carburetors and with such installations it is customary to provide an air feeding manifold structure with which a blower device is associated. The carburetors are usually provided with throttle valves that can be simultaneously adjusted by operation of suitable mechanism. The supercharger is usually driven by the engine and consequently forces air into the manifold in a volume varying with engine speed. Supercharger characteristics combined with resonance in the manifold structure during varying ranges of the engine and supercharger speeds cause pressure surge of air in the manifold. The opening and closing of the engine valves, under certain operating conditions, adds to the pressure surge in the manifold structure. This pressure surge condition in the manifold structure disturbs the desired feeding of air to the carburetors and thereby lowers the efficiency of the engine.

An object of this invention is to provide a supercharged pressure air feeding system for engines with means for damping pressure surge in the air feeding manifold.

Another object of the invention is to provide an engine with means whereby the feeding of air into the manifold structure of a supercharged pressure carburetor system is regulated in a definite relation with the throttle valve opening of the carburetors to prevent surge which would otherwise occur.

Another object of the invention is to provide a control valve, for supercharged air in carburetor systems for engines, that is actuated in a definite relation with and by the throttle valve actuating means.

A further object of the invention is to improve the operation of a supercharged fuel system for engines by the prevention of air surge in the air feeding manifold structure.

Other objects of the invention will appear from the following description taken in connection with the drawings, which form a part of this specification, and in which:

Fig. 1 is a side elevational view of an engine having the invention incorporated therewith;

Fig. 2 is a sectional view of the engine taken on line 2—2 of Fig. 1, showing the air control valve for the intake manifold;

Fig. 3 is a diagram showing the positions of the air throttle valve in the air feeding manifold in relation to the positions of the carburetor throttle valves;

Fig. 4 is a fragmentary plan view of the engine showing the operating mechanism for the carburetor and manifold valves taken on line 4—4 of Fig. 1;

Fig. 5 is a fragmentary front elevational view of the same mechanism shown in Fig. 4;

Fig. 6 is a fragmentary elevational view of the manifold valve and operating mechanism;

Fig. 7 is a view similar to Fig. 6 with the valve and operating mechanism in a different position;

Figure 8:
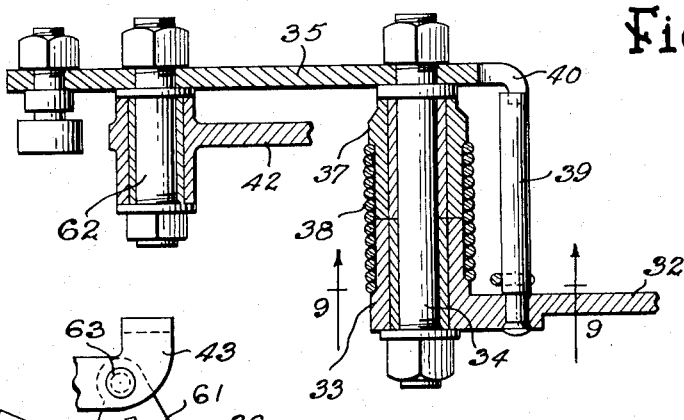
Fig. 8 is a sectional view taken on line 8—8 of Fig. 7.

In the drawings, 10 designates generally a conventional type of multi-cylinder internal combustion engine with which the invention is associated. A pair of carburetors 11 is employed to feed a fuel and air mixture to the cylinder inlet valves and each carburetor has a plurality of feeding conduits leading from the mixture chamber to the fuel inlets of the cylinder. These carburetors are of the downdraft pressure type and they are connected by branch manifolds 13 with the main supply manifold 12 of the manifold structure. The forward end of this main manifold has an air intake end chamber 14 containing a blower 14' located behind a screened inlet casing 17 and is connected therewith by a conduit 16. The blower can be driven from a suitable rotating engine part such as the crankshaft 18. Air from the inlet casing is moved into the main manifold under pressure and passes through the carburetors to the engine cylinders as the inlet valves therefor open.

The carburetors are throttled by valves 19 mounted on shafts 20 having meshing toothed segments 29 fixed thereto so that the shafts will turn similarly when one of them is oscillated. An arm 21 is fixed to the end of one of the shafts 20 and links 22 are pivotally connected to such arms. These links are pivotally connected to bell cranks 23, suitably pivoted on the engine, and a link 24 connects the bell cranks. Suitable linkage 25 is connected to the rear bell crank or the link 24 by means of which the mechanism can be manually adjusted. Springs 26 are associated with the valve segments and the engine to exert pressure tending to close the carburetor throttle valves.

The structure so far described is conventional. It will be noted that air is fed under pressure to the main intake manifold and the branches leading to the carburetors by the supercharger. With such a supercharged air feeding system, it has been found that surge develops in the manifold, due to excess air and blower characteristics, during certain periods of engine operation. Likewise resonance develops in the branch manifolds under certain inlet valve operating conditions and this magnifies the resonance otherwise developed in the main manifold. Such resonance takes the form of pressure surge in the main manifold and results in inefficient engine operation because air flow to the carburetors becomes too unsteady. With one form of engine I have found this resonance to be most objectionable between 2° to 16° carburetor throttle valve opening, the engine operating between 900 and 2000 R. P. M. in such valve adjustment range.

It has been found that this pressure surge in the manifold of a supercharged air feeding system can be substantially reduced by reducing the quantity of air permitted to enter the manifold in a definite relation with the adjustment of the carburetor throttle valves 19. As one means of achieving this result, it is proposed to provide a choke valve 28 that can be adjusted by mechanism connected with and operated by the mechanism for adjusting the carburetor throttle valves. This choke valve can be located in the manifold structure, or in any other position where it will regulate the air volume supplied to the manifold structure.

Valve 28 can be arranged in the air inlet conduit 16 of the manifold structure and is fixed on a rotatably mounted shaft 30. An actuator link 31 is pivotally connected to a crank arm 60 fixed to shaft 30 and to an arm 32 having a hub 33 rotatably mounted on a shaft 34 fixed to and depending from bracket 35 suitably fixed to the engine. Another arm 36 has a hub 37 pivotally mounted on shaft 34, and a tension spring 38 surrounds hubs 33 and 37 and engages at one end against pin 61 on arm 36 and at the other end against pin 39 fixed to arm 32. Pin 39 extends into a slot 40 formed in an edge portion of the bracket 35 that is fixed to the engine so that the movement of arm 32 is thereby limited, and such pin also extends into the path of movement of arm 36. An actuator link 41 is connected to a ball member 41' on link 24 and thus such links operate together in parallel relation. The link 41 is also pivotally connected at its forward end to one arm of a bell crank 42 which is pivotally mounted at 62 on bracket 35. The other arm of such bell crank is connected with arm 36 by a rocker link 43 of U-shape in cross section at one end.

Upon actuation of the carburetor throttle valve mechanism, the link 41 will be moved in unison with link 24 and will rock bell crank 42 and such movement will be transmitted to arm 36 through means of rocker link 43. The coil tension spring, through engagement with pins 61 and 39, tends to hold arms 32 and 36 from relative rotation so that they will act as a single lever but, due to the limited movement of pin 39 in slot 40, arm 32 will travel with arm 36 in only a portion of its movement.

Valve 28 is smaller than the opening in conduit 16, in which it is mounted, so that there will always be a flow of air from the inlet casing to the manifold. The valve is of a type such that a 90° movement could shift it from a closed position traversing the conduit to a full open position in line with the conduit. As shown in Fig. 6, the valve is in its maximum open position where it will be approximately 30° less than wide open, and in Fig. 7 the valve is in its most closed position where it will be approximately 76° less than wide open, or in other words, the valve in Fig. 6 is 60° open and in Fig. 7 it is 14° open. In Fig. 3 the relative positions of carburetor throttle valve opening and air throttle valve closure are shown in degrees and the corresponding engine R. P. M. is also shown. It will be understood that when the choke valve 28 is closed 30° it will allow sufficient air supply to the carburetors for maximum engine requirements, this position of the valve being selected for engine operation below 900 R. P. M. and above 2000 R. P. M., instead of wide open position, because of greater simplicity in the design of the control mechanism. Obviously the valve could be adjusted in a range between wide open position and 46° closed position and the same air choking result would result.

The adjustment of the air choke valve with respect to the adjustment of the throttle carburetor valves to effectively damp pressure surge in the air intake manifold may vary with different designs of engines, and the relative adjustments of such valves can be varied to suit the particular engine to which it is applied. It was found in one type of engine, without the air throttle valve, that resonance was substantially unnoticed during operation below 900 R. P. M., and above 2000 R. P. M., the throttle valves being open 2° when the engine was running at 900 R. P. M. and 16° when the engine was running at 2000 R. P. M., and consequently during such ranges of operation it was unnecessary and undesirable to lessen the amount of air passing under pressure into the intake manifold structure. It was also found that resonance occurred between 900 and 2000 engine R. P. M. and that the greatest resonance occurred at 1600 R. P. M. at which time the carburetor throttle valves were open 9°. In view of these resonance conditions, the control linkage for the air choke valve is so designed that it will be in its most open position providing sufficient air necessary for maximum power development when the engine is operating below 900 R. P. M. and above 2000 R. P. M., and between such speeds the air valve will be moved to choke the air as shown by the curved line as plotted in Fig. 3. Thus when the carburetor valves are moved between 2° and 9° opening, the air choke valve will be moved inversely thereto from 30° to 76° closure. When the carburetor valves are moved between 9° and 16° opening, then the air choke valve will be moved similarly between 76° and 30° closure. Thus, the greatest choking of air in the intake manifold occurs at approximately 9° carburetor throttle valve opening when the engine is operating at 1600 R. P. M.

It is desirable that the air choke valve be operated in conjunction with the carburetor throttle valve operating mechanism and the mechanism heretofore described is arranged to function to obtain the results illustrated in Fig. 3. As viewed in Fig. 1, movement of the link 24 to the right, which is forwardly of the engine, will move the carburetor throttle valves in a closing direction, while movement of such link to the left, which is rearwardly of the engine, will move the carburetor throttle valves in an opening direction. As link 41 is operated with link 24, the bell crank 42 will be moved anti-clockwise upon forward movement of link 24 and clockwise upon rearward movement of such link. Due to the arrangement of the pivotal connections of arm 36, bell crank 42 and the connecting link 43 and the help of pin 39 and spring 38, the linkage produces the operation of the air throttle valve in desired relation to the operation of the throttle valves of the carburetors. The rocking of bell crank 42 carries pivot 64 of the end of link 43 in an arc A, as shown in dotted lines in Figs. 6 and 7, and such movement of the pivot above and below a line in which it aligns with the pivot 62 of bell crank 42 and pivot 63 on arm 36 moves the choke valve 28 to and from its most open position. When such pivotal connections align, the choke valve 28 will be in its most closed position, that is 30° open, as shown in Fig. 7. A portion of the movement of the pivot 64 above and below the aligned relation with pivots 62 and 63 will rock the arms 36 and 32 to shift the valve between its most closed and open positions. This is accomplished through means of spring 38 transmitting motion from pin 61 on arm 36 to pin 39 on arm 32 upon counterclockwise movement of arm 36 and by engagement of arm 36 with pin 39 during clockwise movement.

Figure 9:
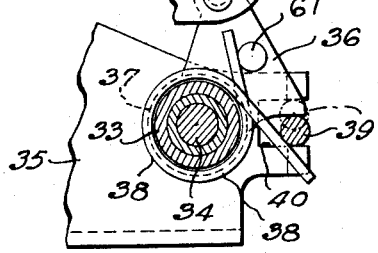
Fig. 9 is a sectional view taken on line 9—9 of Fig. 8.
Figure 10:
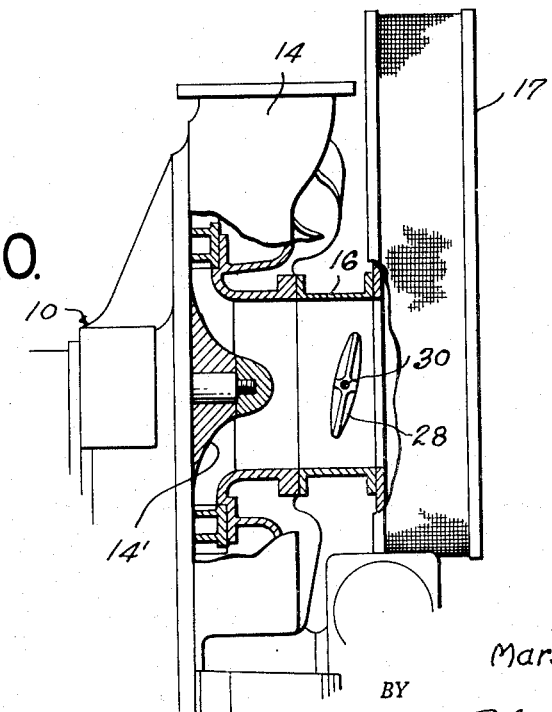
Fig. 10 is a fragmentary enlarged view of the supercharger and air inlet arrangement shown in Fig. 1.

In Figs. 5 and 6 the actuator links 24 and 41 are shown in their most forward positions when the carburetor valves will be open approximately ½° and the air choke valve will be closed approximately 30°. Such extreme position of the carburetor control mechanism is established by contact of one of the valve segments 29 with an idling stop member 65. In this position, arm 36 is disengaged from the pin 39 fixed to arm 32 as the pin has been stopped in its following movement by contact with the upper wall of slot 40 in bracket 35. As the links 24 and 41 are pulled rearwardly from the position shown in Figs. 5 and 6, the pivot 64 travels down on the line of arc A and when it reaches point B the arm 36 will engage pin 39, as shown in Fig. 9, and will carry the pin and arm 32 therewith upon further downward movement thereof. When the pivot 64 reaches point B in downward travel the carburetor valves will be open approximately 2° so any movement of the bell crank 42 between the position shown in Fig. 5 and point B on arc A will have no effect on arm 32 which will lie in the position shown in Fig. 6, and thus while the carburetor valves are being adjusted in the range less than 2° open, the air choke valve will be closed 76°.

As the link 24 is pulled further rearwardly opening of the carburetor valves will continue but the air choke valve will start to close due to downward movement of the arm 36 against pin 39 carrying arm 32 and link 31 downwardly therewith. When the pivot 64 aligns with pivots 62 and 63, as shown in Fig. 7, the air choke valve will be in its most closed position and the carburetor valves will be open approximately 9°. But this is the limit of the downward movement of arm 32 and link 31, as further downward movement of pivot 64 below the aligned position will rock the arm 36 upwardly and the pin 39 will follow it due to the tension spring connection. Thus the rearward pull is continued on the links 24 and 41 after reaching the position shown in Fig. 7, the carburetor valves will continue to open but the air choke valve will move toward closed position until pin 39 is stopped by the upper wall of slot 40. At this point of adjustment the carburetor valves will be open approximately 16°, and the air choke valve will be closed 30° as shown in Fig. 6 where it will remain while the carburetor valves are adjusted in a range beyond 16° opening. Operation of the links forwardly between 16° and 2° carburetor valve opening will cause operation of the air choke valve reversely to that just described.

The restriction to the entry of air under pressure into the manifold structure by the choke valve during the resonance range and in accordance with resonance magnitude normally developed, substantially damps pressure surge that would otherwise disturb the desired feeding of air through the carburetors. As a result of such surge damping, efficient fuel feeding is provided for the best engine operation.

Although the invention has been described in connection with a specific embodiment, the principles involved are susceptible of numerous other applications which will readily occur in persons skilled in the art. The invention is therefore to be limited only as indicated by the scope of the appended claims.

What is claimed is:

1. In a supercharged air feeding system for an internal combustion engine carburetor, a supercharged air inlet manifold structure leading to the carburetor, a throttle valve for the carburetor, a choke valve operable to restrict air passage in the manifold structure, and interconnected mechanisms operable to regulate both said valves whereby said choke valve is in maximum open position at the extreme end portions of the range of movement of the carburetor throttle valve and in less than maximum open position during the intermediate range of movement of the carburetor throttle valve.

2. In an engine carburetion system, a carburetor having throttle valve means, mechanism operable to adjust said valve means, a supercharged air feeding manifold leading to the carburetor, a pivoted choke valve controlling air flow into the manifold, mechanism for swinging said choke valve, and means connecting said throttle valve means adjusting mechanism with said choke valve whereby said choke valve can be swung in two directions while the throttle valve means adjusting mechanism is being moved in one direction.

3. In an engine carburetion system, a carburetor having throttle valve means, mechanism operable to adjust said throttle valve means, a supercharged air feeding manifold connected with said carburetor, a pivoted choke valve controlling air flow into the manifold, mechanism operable to swing the choke valve, and means connecting said mechanisms, said connecting means moving said choke valve mechanism in a closing direction only during an intermediate portion of its range of movement in either direction.

4. In an engine carburetion system, a carburetor having throttle valve means, mechanism operable to adjust said throttle valve means, a supercharged air feeding manifold structure leading to the carburetor, a pivoted choke valve adjustable to control the air volume passing into the manifold structure, mechanism operable to adjust said choke valve, and actuator means connecting said throttle valve adjusting mechanism with said choke valve adjusting mechanism, said actuator means including a linkage for moving said choke valve adjusting mechanism in two directions while the throttle valve adjusting mechanism is moved in one direction and for actuating the choke valve adjusting mechanism only during a part of the movement of the throttle valve adjusting mechanism.

5. In an engine carburetion system, a carburetor having throttle valve means, mechanism operable to adjust the position of said throttle valve means, a supercharged air feeding manifold leading to the carburetor, a choke valve controlling air flow into the manifold, mechanism operable to adjust said choke valve, and means interconnecting said mechanisms whereby said choke valve is moved to admit an increased volume of air into the manifold twice during a full operation of the carburetor valve means in either direction.

6. In an engine, a carburetor having a throttle valve, means for feeding air to the carburetor under high pressure, means for regulating the flow of high pressure air through the feeding means, and means interconnecting said throttle valve and said regulating means whereby the flow of high pressure air to the carburetor will be restricted while the throttle valve is in an intermediate portion of its range of adjustment.

MARSDEN WARE.